United States Patent
Tomita

(10) Patent No.: US 8,445,597 B2
(45) Date of Patent: May 21, 2013

(54) PRESSURE-SENSITIVE ADHESIVE COMPOSITION FOR PDP FRONT FILTER AND USE THEREOF

(75) Inventor: Koji Tomita, Sayama (JP)

(73) Assignee: Soken Chemical & Engineering Co., Ltd., Tokyo (JP)

( * ) Notice: Subject to any disclaimer, the term of this patent is extended or adjusted under 35 U.S.C. 154(b) by 550 days.

(21) Appl. No.: 12/374,377

(22) PCT Filed: Jun. 14, 2007

(86) PCT No.: PCT/JP2007/062039
§ 371 (c)(1),
(2), (4) Date: Jan. 20, 2009

(87) PCT Pub. No.: WO2008/010367
PCT Pub. Date: Jan. 24, 2008

(65) Prior Publication Data
US 2009/0326155 A1    Dec. 31, 2009

(30) Foreign Application Priority Data

Jul. 20, 2006    (JP) .................. 2006-198632

(51) Int. Cl.
*C08L 33/06*    (2006.01)
*B32B 15/04*    (2006.01)
*B32B 7/12*    (2006.01)

(52) U.S. Cl.
USPC ............ 525/228; 525/227; 525/222; 156/332

(58) Field of Classification Search
USPC .... 525/228, 227, 222; 156/332; 428/355 AC, 428/355 R
See application file for complete search history.

(56) References Cited

U.S. PATENT DOCUMENTS

| | | | | |
|---|---|---|---|---|
| 5,512,612 A | * | 4/1996 | Brown et al. ................. | 523/218 |
| 5,648,166 A | * | 7/1997 | Dunshee ................. | 428/355 AC |
| 6,448,339 B1 | | 9/2002 | Tomita | |

FOREIGN PATENT DOCUMENTS

| | | | |
|---|---|---|---|
| JP | 5070752 | * | 3/1993 |
| JP | 5070752 A | | 3/1993 |
| JP | 10310754 A | | 11/1998 |
| JP | 2001049200 A | | 2/2001 |
| JP | 2002107507 A | | 4/2002 |
| JP | 2002327160 | * | 11/2002 |
| JP | 2002327160 A | | 11/2002 |
| JP | 2002372619 | * | 12/2002 |
| JP | 2002372619 A | | 12/2002 |
| JP | 2003027019 A | | 1/2003 |
| JP | 2003105298 A | | 4/2003 |
| JP | 2004256599 A | | 9/2004 |
| JP | 2005146151 | * | 6/2005 |

* cited by examiner

*Primary Examiner* — Irina Krylova
(74) *Attorney, Agent, or Firm* — The Webb Law Firm

(57) ABSTRACT

A pressure-sensitive adhesive composition for PDP front filters includes 100 parts by weight of a high molecular weight acrylic polymer A having a COOH or OH group, a weight average molecular weight (Mw) of 400,000 to less than 800,000, a molecular weight distribution (Mw/Mn) of not more than 5 and a glass transition temperature (Tg-A) of −40 to −10° C., and 5 to 20 parts by weight of a low molecular weight acrylic polymer B having a weight average molecular weight (Mw) of 10,000 to 50,000, a molecular weight distribution (Mw/Mn) of not more than 5 and a glass transition temperature (Tg-B) of 40 to 120° C.; and is crosslinked to a gel fraction of 50 to 90% and has a 90° peel strength of 5 to 15 N/25 mm. The pressure-sensitive adhesive composition does not cause bonding failures such as lifting even when exposed to thermal cycles.

5 Claims, No Drawings

PRESSURE-SENSITIVE ADHESIVE COMPOSITION FOR PDP FRONT FILTER AND USE THEREOF

This application is a National Stage of International Application PCT/JP2007/062039, filed on Jun. 14, 2007. This application claims priority to Japanese application JP 2006-198632, filed on Jul. 20, 2006. The disclosures of the above applications are incorporated herein by reference.

FIELD OF THE INVENTION

The present invention relates to pressure-sensitive adhesive compositions that are suitably used to bond functional filter films arranged in the front of display devices such as PDP devices.

BACKGROUND OF THE INVENTION

Flat-model liquid crystal display devices and PDP devices have largely replaced CRT devices in the field of display devices such as computers and televisions. Of the flat-model display devices, PDP devices present sharper images because pixels themselves emit light. PDP devices are therefore frequently used in place of liquid crystal display devices.

It is necessary with PDP devices that an EMI filter is bonded to the front to shield electromagnetic waves generated by the emission of light from pixels. Because the surface of PDP devices becomes hot during operation and cools after shutdown, adhesives that are applied to PDP are required to have little change in bond strength by thermal cycles and maintain good bonding over long periods. EMI filters are sometimes applied to the plasma display panel directly, and misalignment or filter defects may require that the filters are removed. It is therefore necessary that the EMI filters are removable clean without residual adhesive.

Regarding pressure-sensitive adhesive films for the bonding of electronic displays including plasma display panels, Patent Document 1 (JP-A-2002-107507) discloses a pressure-sensitive adhesive film wherein the pressure-sensitive adhesive contains a (meth)acrylic resin having a weight average molecular weight (Mw) of 500,000 to 2,000,000 and a glass transition temperature (Tg) of not more than −20° C. and an acrylic resin having a weight average molecular weight (Mw) of 1000 to 100,000 and a glass transition temperature (Tg) of not less than 50° C. in a weight ratio of 97-80:3-20 and further contains a crosslinking agent (C).

By containing the high molecular weight (meth)acrylic resin and the low molecular weight (meth)acrylic resin in the specific ratio, this pressure-sensitive adhesive achieves relatively good properties for the bonding of electronic displays. However, lifting or separation often arises from the pressure-sensitive adhesive layer during long use accompanied by thermal cycles such as in PDP devices wherein the temperature is greatly changed by the operation.

Patent Document 2 (JP-A-2004-256599) discloses a pressure-sensitive adhesive composition and a pressure-sensitive adhesive optical sheet with the composition wherein the composition contains a (meth)acrylate copolymer having a weight average molecular weight (Mw) of 400,000 to 2,500,000 and a glass transition temperature of not more than 0° C. and a (meth)acrylate copolymer having a weight average molecular weight (Mw) of 1000 to 50,000 and a glass transition temperature (Tg) of 80 to 230° C. in a ratio of 100:5-200 and further contains a crosslinking agent.

The pressure-sensitive adhesive composition and the pressure-sensitive adhesive optical sheet achieve excellent properties as optical members by the crosslinking of the high molecular weight (meth)acrylate copolymer and the low molecular weight (meth)acrylate copolymer that are contained in the specific ratio. However, lifting or separation often arises from the pressure-sensitive adhesive layer during long use accompanied by thermal cycles such as in PDP devices wherein the temperature is greatly changed by the operation.

Patent Document 3 (JP-A-H10-310754) discloses a pressure-sensitive adhesive composition that contains 100 parts by weight of an alkyl (meth)acrylate copolymer (1) having a weight average molecular weight (Mw) of not less than 800,000 and 1 to 40 parts by weight of an alkyl acrylate copolymer (2) having a weight average molecular weight of not more than 100,000. However, Patent Document 3 does not have a technical idea that the high molecular weight alkyl (meth)acrylate copolymer (1) may be an alkyl (meth)acrylate copolymer having a weight average molecular weight (Mw) of less than 800,000.

Patent Document 4 (JP-A-H5-70752) describes that improved heat resistance and cold resistance are obtained in the production of acrylic pressure-sensitive adhesive compositions and pressure-sensitive adhesive tapes, labels or sheets by controlling the acryl polymer's molecular weight distribution (Mw/Mn) to not more than 4. Further, it describes that heat resistance is enhanced by increasing the glass transition temperature. Patent Document 4 teaches that the products are used in the electric and electronic fields but does not mention use in the optical field such as PDP.

Patent Document 1: JP-A-2002-107507
Patent Document 2: JP-A-2004-256599
Patent Document 3: JP-A-H10-310754
Patent Document 4: JP-A-H5-70752

SUMMARY OF THE INVENTION

It is an object of the invention to provide pressure-sensitive adhesive compositions that are suited for bonding a functional filter film such as an EMI filter to the front of a thin-model PDP device.

A pressure-sensitive adhesive composition for PDP front filters according to the present invention comprises a high molecular weight acrylic polymer A having requirements a-1 to a-6 below and a low molecular weight acrylic polymer B having requirements b-1 to b-5 below in a weight ratio A:B=100:5-20, and is crosslinked with a crosslinking agent to a gel fraction of 50 to 90% and has a 90° peel strength (peeling rate=50 min/min) of 5 to 15 N/25 mm:

<High Molecular Weight Acrylic Polymer A>
  the polymer is a copolymer which comprises:
  a-1: a (meth)acrylate monomer and, based on 100 parts by weight of the (meth)acrylate monomer (a-1),
  a-2: 1 to 10 parts by weight of a COOH or OH group-containing monomer, and
  a-3: 0 to 10 parts by weight of a monomer copolymerizable with the (meth)acrylate monomer (a-1); and which has:
  a-4: a weight average molecular weight (Mw) of 400,000 to less than 800,000,
  a-5: a molecular weight distribution (Mw/Mn) of not more than 5, and
  a-6: a glass transition temperature (Tg-A) of the acrylic polymer A in the range of −40 to −10° C.;
<Low Molecular Weight Acrylic Polymer B>
  the polymer is a copolymer which comprises:
  b-1: a (meth)acrylate monomer and, based on 100 parts by weight of the (meth)acrylate monomer (b-1), b-2: 0 to 10 parts by weight of a monomer copolymerizable with the (meth)acrylate monomer (b-1); and which has:

b-3: a weight average molecular weight (Mw) of 10,000 to 50,000, b-4: a molecular weight distribution (Mw/Mn) of not more than 5, and b-5: a glass transition temperature (Tg-B) of the acrylic polymer B in the range of 40 to 120° C.

The pressure-sensitive adhesive composition is suitably used for the bonding of a POP front filter.

The pressure-sensitive adhesive compositions for POP front filters according to the invention have the aforementioned constitution and may be suitably used for the bonding of an EMI film and a glass substrate in the front of PDP. In particular, the compositions will not cause bonding failures such as lifting even when exposed to thermal cycles.

ADVANTAGES OF THE INVENTION

The pressure-sensitive adhesive compositions for PDP front filters according to the invention contain the specific high molecular weight acrylic polymer (A) and the specific low molecular weight acrylic polymer (B) and are crosslinked with a crosslinking agent. The pressure-sensitive adhesive compositions show excellent adhesion with respect to both an EMI filter and a glass substrate arranged in the front of PDP, and the compositions do not cause lifting even when used under severe conditions for long periods. In particular, the pressure-sensitive adhesive compositions for PDP front filters will not cause bonding failures such as lifting even when exposed to thermal cycles with repeated heating and cooling.

The pressure-sensitive adhesive compositions for PDP front filters may be applied to a plasma display panel directly. When misalignment or defects occur, the compositions permit easy removal of the filter without residual adhesive. Once the compositions effect bonding, bonding failures such as lifting are unlikely. The compositions are suitably used as pressure-sensitive adhesives for bonding PDP front filters.

DETAILED DESCRIPTION OF THE INVENTION

The pressure-sensitive adhesive compositions according to the present invention will be described below focusing on pressure-sensitive adhesive compositions for PDP front filters.

The pressure-sensitive adhesive compositions for PDP front filters according to the invention are obtained by crosslinking a high molecular weight acrylic polymer (A) and a low molecular weight acrylic polymer (B) with a crosslinking agent.

The high molecular weight acrylic polymer (A) is a copolymer which includes:

a-1: a (meth)acrylate monomer and, based on 100 parts by weight of the (meth)acrylate monomer (a-1), a-2: 1 to 10 parts by weight, and preferably 2 to 5 parts by weight of a COOH or OH group-containing monomer, and a-3: 0 to 10 parts by weight, and preferably 0 to 5 parts by weight of a monomer copolymerizable with the (meth)acrylate monomer (a-1).

The (meth)acrylate monomers (a-1) for the high molecular weight acrylic polymer (A) in the invention are generally alkyl (meth)acrylates having C1-12 alkyl groups. Specific examples of the (meth)acrylate monomers (a-1) include methyl (meth)acrylate, ethyl (meth)acrylate, n-propyl (meth) acrylate, iso-propyl (meth)acrylate, n-butyl (meth)acrylate, iso-butyl (meth)acrylate, tert-butyl (meth)acrylate, pentyl (meth)acrylate, hexyl (meth)acrylate, heptyl (meth)acrylate, 2-ethylhexyl (meth)acrylate, octyl (meth)acrylate, nonyl (meth)acrylate, decyl (meth)acrylate, undeca (meth)acrylate and dideca (meth)acrylate. The (meth)acrylates may be used singly or in combination. Of these, butyl (meth)acrylate, methyl (meth)acrylate and iso-butyl (meth)acrylate are preferred.

The components (a-2) for the high molecular weight acrylic polymer (A) are compounds that have monomers containing a COOH or OH group in the molecule. The compounds (a-2) are copolymerizable with the components (a-1).

Of the components (a-2), the compounds having a COOH group include acrylic acid, methacrylic acid, maleic acid, crotonic acid, itaconic acid and β-carboxyethyl acrylate. Of the components (a-2), the compounds having an OH group include 2-hydroxyethyl (meth)acrylate (2-HEA in the case of acrylate), hydroxypropyl (meth)acrylate, 2-hydroxybutyl (meth)acrylate, chloro-2-hydroxyethyl (meth)acrylate, 4-hydroxybutyl (meth)acrylate, 6-hydroxyhexyl (meth)acrylate and 8-hydroxyoctyl (meth)acrylate. The COOH group-containing compounds and the OH group-containing compounds may be used singly or in combination. Compounds having both a COOH group and an OH group in the molecule may be used. Of these compounds, (meth)acrylic acid and 2-hydroxyethyl (meth)acrylate are preferable. In the high molecular weight acrylic polymer (A) including the COOH or OH group-containing compound, units derived from the COOH or OH group-containing compound provide at least part of the COOH or OH groups as crosslinking sites, which react with a crosslinking agent described later to form a crosslinked structure.

Examples of the monomers (a-3) copolymerizable with the (meth)acrylate monomers (a-1) for the high molecular weight acrylic polymer (A) include vinyl acetate; (meth)acrylonitrile; cyclohexyl (meth)acrylate, benzyl (meth)acrylate, phenyl (meth)acrylate; amide group-containing monomers (e.g., (meth)acrylamide); amino group-containing monomers (e.g., dimethylaminoethyl (meth)acrylate, diethylaminoethyl (meth)acrylate); macromonomers; styrene and alkylstyrenes such as methylstyrene, dimethylstyrene, trimethylstyrene, propylstyrene, butylstyrene, hexylstyrene, heptylstyrene and octylstyrene; styrene monomers such as fluorostyrene, chlorostyrene, bromostyrene, dibromostyrene, iodostyrene, nitrostyrene, acetylstyrene and methoxystyrene; glycidyl acrylate, glycidyl methacrylate; maleimide group-containing monomers such as maleimide monomers including maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide. Here, the macromonomers refer to high molecular weight monomers that are copolymerizable with other monomers and have a (meth)acryloyl group at a terminal; they usually contain a high molecular weight part and a terminal functional group part. The high molecular weight part of the macromonomers is generally a structure wherein a monomer component such as methyl (meth)acrylate, styrene, acrylonitrile or isobutyl (meth)acrylate is polymerized. The high molecular weight part is terminated with a functional group such as (meth)acryloyl group. Examples of such macromonomers include methacryloyl group-terminated poly (methyl methacrylate), methacryloyl group-terminated polystyrene, methacryloyl group-terminated poly(styrene/acrylonitrile methacrylate) and methacryloyl group-terminated poly(isobutyl acrylate). The weight average molecular weight of the high molecular weight parts of the macromonomers is generally in the range of 1000 to 50,000.

When the macromonomers are used, they may be used singly or in combination. The amount of the macromonomers may be determined appropriately in view of properties of the obtainable high molecular weight acrylic polymer (A), but the amount is generally 1 to 5 parts by weight based on 100 parts by weight of the alkyl (meth)acrylate (a-1). When the macromonomer is used in the production of the high molecular weight acrylic polymer (A), methacryloyl group-terminated polymethacrylate may be preferably used.

The high molecular weight acrylic polymer (A) may be produced by copolymerizing 100 parts by weight of the component (a-1), 1 to 10 parts by weight, preferably 2 to 5 parts by weight of the component (a-2), and 0 to 10 parts by weight, preferably 1 to 5 parts by weight of the component (a-3).

The weight average molecular weight (a-4) of the high molecular weight acrylic polymer (A) should be in the range of 400,000 to less than 800,000, and preferably 500,000 to 700,000. If the weight average molecular weight (a-4) of the high molecular weight acrylic polymer (A) exceeds 800,000, the obtainable composition lowers adhesion with electromagnetic wave shielding films (EMI filters=copper mesh films) arranged on the surface of plasma display panels. Consequently, the EMI films are lifted when exposed to high temperatures for long periods (for example, 90° C. for 500 hours). In the invention, the weight average molecular weight (Mw) and number average molecular weight (Mn) of the acrylic polymers are measured by gel permeation chromatography (GPC).

The high molecular weight acrylic polymer (A) has a molecular weight distribution (Mw/Mn) (a-5) of not more than 5, and preferably in the range of 3 to 5. Molecular weight distribution (Mw/Mn) more than 5 means that the high molecular weight acrylic polymer (A) has a wide range of molecular weights. The use of such high molecular weight acrylic polymer (A) exceeding 5 in molecular weight distribution (Mw/Mn) results in the reduction of durability of the adhesive with respect to the front glass and EMI film of PDP. When such PDP devices are exposed to high temperatures for long periods, for example 90° C. for 500 hours, the film is lifted.

The high molecular weight acrylic polymer (A) should have a glass transition temperature (Tg-A) (a-6) in the range of −40 to −10° C., and preferably the glass transition temperature (Tg-A) is in the range of −40 to −20° C. If the glass transition temperature (Tg-A) is lower than −40° C., the obtainable adhesive composition does not show good adhesion with respect to a front glass plate or EMI film of PDP, and lifting is caused during long periods at high temperatures.

The high molecular weight acrylic polymer (A) having the aforementioned properties may be produced for example by polymerizing the monomer components in an organic solvent. A polymerization initiator may be used in the reaction. Exemplary polymerization initiators used herein include potassium persulfate, ammonium persulfate, azo compounds including 2,2'-azobisisobutyronitrile (AIBN), 2,2'-azobis(4-methoxy-2,4-dimethylvaleronitrile), 2,2'-azobis-2,4-dimethylvaleronitrile and 1,1'-azobis-cyclohexane-1-carbonitrile, isobutyryl peroxide, α,α'-bis(neodecanoylperoxy)diisopropylbenzene, cumyl peroxyneodecanoate, di-n-propyl peroxydicarbonate, diisopropyl peroxydicarbonate, di-sec-butyl peroxydicarbonate, 1,1,3,3-tetramethylbutyl peroxyneodecanoate, bis(4-butylcyclohexyl) peroxydicarbonate, benzoyl peroxide, di-tert-butyl peroxide, lauroyl peroxide and tert-butyl-oxy-2-ethyl hexanoate.

In the production of the high molecular weight acrylic polymer (A), an acrylic polymer of high molecular weight may be obtained by carrying out the reaction slowly with use of a solvent having a relatively low boiling point. For example, the reaction may be carried out using an organic solvent of relatively low boiling point such as ethyl acetate (b.p.=77.2° C.), and a polymerization initiator with a relatively high 10-hour half life temperature such as azobisisobutyronitrile, whereby a high molecular weight acrylic polymer (A) having a weight average molecular weight of 400,000 to less than 800,000 may be produced. By carrying out the reaction under these mild conditions, the obtainable acrylic polymer has relatively uniform molecular weights with a molecular weight distribution (Mw/Mn) of not more than 5. On the other hand, the molecular weight of the obtainable polymer is lowered and the molecular weight distribution (Mw/Mn) is increased when the reaction is performed under severe conditions at high temperatures by using a high-boiling organic solvent such as toluene and adding a polymerization initiator in portions. The glass transition temperature (Tg-A) of the high molecular weight acrylic polymer (A) may be controlled by changing the chemical composition of the monomers forming the high molecular weight acrylic polymer (A). The glass transition temperature (Tg-A) of the high molecular weight acrylic polymer (A) may be determined with the Fox equation based on the types and amounts of the monomers forming the acrylic polymer.

In the production of the high molecular weight acrylic polymer (A), the reaction may be carried out in an inert gas atmosphere such as nitrogen using the organic solvents and polymerization initiators as described hereinabove.

The pressure-sensitive adhesive compositions for PDP front filters contain the high molecular weight acrylic polymer (A) as described above and a low molecular weight acrylic polymer (B) as polymer components.

The low molecular weight acrylic polymer B used in the pressure-sensitive adhesive compositions for PDP front filters according to the present invention is a copolymer which comprises:

b-1: a (meth)acrylate monomer and, based on 100 parts by weight of the (meth)acrylate monomer (b-1), b-2: 0 to 10 parts by weight of a monomer copolymerizable with the (meth)acrylate monomer (b-1); and which has:

b-3: a weight average molecular weight (Mw) of 10,000 to 50,000, b-4: a molecular weight distribution (Mw/Mn) of not more than 5, and b-5: a glass transition temperature (Tg-B) of the acrylic polymer B in the range of 40 to 120° C.

The (meth)acrylate monomers (b-1) for the low molecular weight acrylic polymer (B) in the invention are generally alkyl (meth)acrylates having C1-12 alkyl groups. Specific examples of the (meth)acrylate monomers (b-1) include methyl (meth)acrylate, ethyl (meth)acrylate, n-propyl (meth)acrylate, iso-propyl (meth)acrylate, n-butyl (meth)acrylate, iso-butyl (meth)acrylate, tert-butyl (meth)acrylate, pentyl (meth)acrylate, hexyl (meth)acrylate, heptyl (meth)acrylate, octyl (meth)acrylate, nonyl (meth)acrylate, decyl (meth)acrylate, undeca (meth)acrylate, dideca (meth)acrylate and cyclohexyl (meth)acrylate. The (meth)acrylates may be used singly or in combination. Of these, methyl methacrylate, n-butyl methacrylate and iso-butyl methacrylate are preferred. When the low molecular weight acrylic polymer (B) is composed of the component (b-1), it may be a homopolymer of the component (b-1) or a copolymer of different kinds of the components (b-1). For example, iso-butyl methacrylate homopolymer may be used.

The components (b-2) for the low molecular weight acrylic polymer (B) are compounds that have a group polymerizable with the components (b-1). The components (b-2) do not generally have functional groups reactable with crosslinking agents as described later, but may have such functional groups.

Examples of the components (b-2) include benzyl (meth)acrylate, phenyl (meth)acrylate; (meth)acrylonitrile, amide group-containing monomers (e.g., (meth)acrylamide), amino group-containing monomers (e.g., dimethylaminoethyl (meth)acrylate, diethylaminoethyl (meth)acrylate); styrene and alkylstyrenes such as methylstyrene, dimethylstyrene, trimethylstyrene, propylstyrene, butylstyrene, hexylstyrene, heptylstyrene and octylstyrene; styrene monomers such as fluorostyrene, chlorostyrene, bromostyrene, dibromostyrene, iodostyrene, nitrostyrene, acetylstyrene and methoxystyrene; glycidyl acrylate, glycidyl methacrylate; maleimide group-containing monomers such as maleimide monomers including maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; vinyl acetate;

acrylic acid, methacrylic acid, maleic acid, crotonic acid, itaconic acid, β-carboxyethyl acrylate; 2-hydroxyethyl (meth)acrylate (2-HEA in the case of acrylate), hydroxypropyl (meth)acrylate, 2-hydroxybutyl (meth)acrylate, chloro-2-hydroxyethyl (meth)acrylate, 4-hydroxybutyl (meth)acrylate, 6-hydroxyhexyl (meth)acrylate and 8-hydroxyoctyl (meth)acrylate.

The low molecular weight acrylic polymer (B) may be produced by copolymerizing 100 parts by weight of the component (b-1) and 0 to 10 parts by weight, preferably 0 to 5 parts by weight of the component (b-2). The low molecular weight acrylic polymer (B) has a weight average molecular weight (Mw) (b-3) by gel permeation chromatography (GPC) in the range of 10,000 to 50,000, and preferably 20,000 to 40,000. The molecular weight distribution (Mw/Mn) (b-4) of the low molecular weight acrylic polymer (B) is not more than 5, and preferably in the range of 2 to 4. That is, the low molecular weight acrylic polymer (B) has highly uniform molecular weights. If the low molecular weight acrylic polymer (B) has a molecular weight distribution (Mw/Mn) (b-4) exceeding 5, the obtainable adhesive composition lowers bonding durability with respect to glass substrates and EMI films and tends to cause defects such as lifting when the adhesive is heated.

The low molecular weight acrylic polymer (B) has a glass transition temperature (Tg-B) of 40 to 120° C., and preferably 80 to 105° C. If the low molecular weight acrylic polymer (B) has an excessively low glass transition temperature (Tg-B), the obtainable adhesive composition lowers bonding durability with respect to glass substrates and EMI films and tends to cause defects such as lifting when the adhesive is heated.

The low molecular weight acrylic polymer (B) may be produced by (co)polymerizing the monomer component(s) under reflux using a high-boiling organic solvent such as toluene. In particular, a low molecular weight acrylic polymer (B) having a low molecular weight and uniform molecular weight distribution may be obtained when the reaction is carried out by adding dropwise to a heated reaction solvent a monomer/polymerization initiator mixture liquid in which the monomer component(s) and a polymerization initiator (the polymerization initiator used in the production of the high molecular weight acrylic polymer) are mixed together.

The pressure-sensitive adhesive compositions for PDP front filters contain a crosslinking agent in addition to the high molecular weight acrylic polymer (A) and the low molecular weight acrylic polymer (B).

The crosslinking agents in the invention form a crosslinked structure by bonding to the polar groups such as the COOH or OH group in the high molecular weight acrylic polymer (A) or the low molecular weight acrylic polymer (B). Examples of the crosslinking agents include epoxy crosslinking agents and isocyanate crosslinking agents.

The epoxy crosslinking agents include ethylene glycol diglycidyl ether, propylene glycol diglycidyl ether and tetraglycidyl xylene diamine. Commercially available epoxy crosslinking agents such as TETRAD-X (manufactured by MITSUBISHI GAS CHEMICAL COMPANY, INC.) may be used. The isocyanate crosslinking agents include diisocyanate monomers such as tolylene diisocyanate, trimethylolpropane tolylene diisocyanate, diphenylmethane triisocyanate, chlorophenylene diisocyanate, hexamethylene diisocyanate, xylene diisocyanate, diphenylene methane diisocyanate and hydrogenated diphenylmethane diisocyanate; isocyanate compounds obtained by adding the above isocyanate compounds to compounds such as trimethylolpropane; isocyanurate compounds; biuret compounds; and urethane prepolymer isocyanates obtained by addition reaction of the above isocyanate compounds with polyether polyols, polyester polyols, acryl polyols, polybutadiene polyols or polyisoprene polyols. Commercially available isocyanate crosslinking agents such as CORONATE L (manufactured by NIPPON POLYURETHANE INDUSTRY CO., LTD.) may be used.

The pressure-sensitive adhesive compositions for PDP front filters contain the crosslinking agents in amounts such that the gel fraction of the composition will be in the range of 50 to 90 wt %, and preferably 60 to 80 wt %. If the gel fraction exceeds this range, the composition lowers adhesion with respect to glass substrates and PDP front members in particular EMI films, and tends to cause lifting or separation. The amount of the crosslinking agents may vary depending on the types of the crosslinking agents. For example, the epoxy crosslinking agents may be generally used in an amount of 0.01 to 0.25 part by weight, and preferably 0.02 to 0.2 part by weight, and the polyisocyanate crosslinking agents may be generally used in an amount of 0.1 to 3 parts by weight, and preferably 0.5 to 2 parts by weight based on 100 parts by weight of the high molecular weight acrylic polymer (A) and the low molecular weight acrylic polymer (B) combined.

The pressure-sensitive adhesive compositions for PDP front filters are generally used as sheets by being spread on the surface of release films or the like. To spread the compositions, general methods such as doctor blade coating and spin coating may be used. The application thickness is generally 15 to 50 μm, and preferably 20 to 35 μm. After the pressure-sensitive adhesive composition is applied, it is cured at temperatures of about 20 to 30° C. generally for 1 to 20 days, and preferably 3 to 15 days in order to stabilize the crosslinked structure formed by the crosslinking agent.

Once the pressure-sensitive adhesive composition effects bonding, the peel strength measured at a peeling rate of 50 mm/min is in the range of 5 to 15 N/25 mm, and preferably 10 to 15 N/25 mm. The peel strength is measured at room temperature (25° C.).

This peel strength of the pressure-sensitive adhesive compositions for PDP front filters permits a PDP front filter such as the pressure-sensitive adhesive sheet of the invention to be removed without residual adhesive in case of failure of the application. Further, the pressure-sensitive adhesive compositions possess very high resistance to thermal cycles. It is therefore very unlikely that separation or lifting is caused even when the PDP surface temperature is repeatedly changed by operation of PDP devices.

The pressure-sensitive adhesive compositions may be used to bond optical films such as PDP front filters. Here, the optical films include EMI films, AR films and NIR films.

EXAMPLES

The pressure-sensitive adhesive compositions for PDP front filters according to the present invention will be described in detail below by presenting examples without limiting the scope of the invention.

Production Example 1

Synthesis of High Molecular Weight Acrylic Polymer A-1

A reactor equipped with a stirring blade, a reflux condenser, a thermometer and a nitrogen inlet tube was charged with 76.5 parts by weight of butyl acrylate (BA), 20 parts by weight of methyl acrylate (MA), 3.5 parts by weight of acrylic acid (AA) and 150 parts by weight of ethyl acetate as a solvent. Further, 0.1 part by weight of azobisisobutyronitrile as a reaction initiator was added, and polymerization was carried out under a stream of nitrogen gas at 70° C. for 4 hours.

After the reaction, the reaction solution was diluted with a large amount of ethyl acetate. An ethyl acetate solution of a high molecular weight acrylic polymer A-1 (solid: 20 wt %) was thus obtained.

The weight average molecular weight (Mw) measured by gel permeation chromatography (GPC) of the high molecular weight acrylic polymer (A-1) was 700,000, the molecular weight distribution (Mw/Mn) was 4.5, and the glass transition temperature (Tg-A1) was −40° C.

Production Example 2

Synthesis of High Molecular Weight Acrylic Polymer A-2

An ethyl acetate solution of a high molecular weight acrylic polymer A-2 (solid: 20 wt %) was obtained in the same manner as in Production Example 1, except that 56.5 parts by weight of butyl acrylate (BA), 40 parts by weight of methyl acrylate (MA) and 3.5 parts by weight of acrylic acid (AA) were used as monomers and the amount of ethyl acetate as a reaction solvent was changed to 165 parts by weight.

The weight average molecular weight (Mw) of the high molecular weight acrylic polymer (A-2) measured by the same method as in Production Example 1 was 700,000, the molecular weight distribution (Mw/Mn) was 4.3, and the glass transition temperature (Tg-A2) was −28° C.

Production Example 3

Synthesis of High Molecular Weight Acrylic Polymer A-3

An ethyl acetate solution of a high molecular weight acrylic polymer A-3 (solid: 20 wt %) was obtained in the same manner as in Production Example 1, except that 61.5 parts by weight of butyl acrylate (BA), 30 parts by weight of methyl acrylate (MA), 5 parts by weight of a macromonomer (AA-6) and 3.5 parts by weight of acrylic acid (AA) were used as monomers and the amount of ethyl acetate as a reaction solvent was changed to 160 parts by weight.

The weight average molecular weight (Mw) of the high molecular weight acrylic polymer (A-3) measured by the same method as in Production Example 1 was 730,000, the molecular weight distribution (Mw/Mn) was 4.9, and the glass transition temperature (Tg-A3) was −29° C.

The macromonomer AA-6 used in this production example was a polymeric monomer with a methacryloyl terminal group that was copolymerizable with the other monomers (methacryloyl group-terminated poly(methyl methacrylate) manufactured by TOAGOSEI CO., LTD.).

Production Example 4

Synthesis of High Molecular Weight Acrylic Polymer A-4

An ethyl acetate solution of a high molecular weight acrylic polymer A-4 (solid: 20 wt %) was obtained in the same manner as in Production Example 1, except that 78 parts by weight of butyl acrylate (BA), 20 parts by weight of methyl acrylate (MA) and 2 parts by weight of 2-hydroxyethyl acrylate (2-HEA) were used as monomers.

The weight average molecular weight (Mw) of the high molecular weight acrylic polymer (A-4) measured by the same method as in Production Example 1 was 700,000, the molecular weight distribution (Mw/Mn) was 4.4, and the glass transition temperature (Tg-A4) was −40° C.

Production Example 5

Synthesis of High Molecular Weight Acrylic Polymer A-5

An ethyl acetate solution of a high molecular weight acrylic polymer A-5 (solid: 20 wt %) was obtained in the same manner as in Production Example 1, except that 86.5 parts by weight of butyl acrylate (BA), 10 parts by weight of methyl acrylate (MA) and 3.5 parts by weight of acrylic acid (AA) were used as monomers.

The weight average molecular weight (Mw) of the high molecular weight acrylic polymer (A-5) measured by the same method as in Production Example 1 was 700,000, the molecular weight distribution (Mw/Mn) was 4.7, and the glass transition temperature (Tg-A5) was −45° C.

Production Example 6

Synthesis of High Molecular Weight Acrylic Polymer A-6

A reactor equipped with a stirring blade, a reflux condenser, a thermometer and a nitrogen inlet tube was charged with 76.5 parts by weight of butyl acrylate (BA), 20 parts by weight of methyl acrylate (MA), 3.5 parts by weight of acrylic acid AA) and 150 parts by weight of ethyl acetate as a solvent Further, 0.1 part by weight of azobisisobutyronitrile as a reaction initiator was added, and polymerization was carried out under a stream of nitrogen gas at 70° C. for 2 hours.

Thereafter, 0.2 part by weight of reaction initiator azobisisobutyronitrile was added, and reaction was carried out at 78° C. for another 4 hours.

After the reaction, the reaction solution was diluted with a large amount of ethyl acetate. An ethyl acetate solution of a high molecular weight acrylic polymer A-6 (solid: 20 wt %) was thus obtained.

The weight average molecular weight (Mw) of the high molecular weight acrylic polymer (A-6) measured by the same method as in Production Example 1 was 700,000, the molecular weight distribution (Mw/Mn) was 12.8, and the glass transition temperature (Tg-A6) was 40° C.

Production Example 7

Synthesis of High Molecular Weight Acrylic Polymer A-7

An ethyl acetate solution of a high molecular weight acrylic polymer A-7 (solid: 20 wt %) was obtained in the same manner as in Production Example 1, except that the initial amount of ethyl acetate as a reaction solvent was changed from 150 parts by weight to 130 parts by weight.

The weight average molecular weight (Mw) of the high molecular weight acrylic polymer (A-7) measured by the same method as in Production Example 1 was 900,000, the molecular weight distribution (Mw/Mn) was 4.0, and the glass transition temperature (Tg-A7) was −40° C.

Production Example 8

Synthesis of High Molecular Weight Acrylic Polymer A-8

An ethyl acetate solution of a high molecular weight acrylic polymer A-8 (solid: 20 wt %) was obtained in the same manner as in Production Example 1, except that the initial amount of ethyl acetate as a reaction solvent was changed from 150 parts by weight to 170 parts by weight.

The weight average molecular weight (Mw) of the high molecular weight acrylic polymer (A-8) measured by the same method as in Production Example 1 was 450,000, the molecular weight distribution (Mw/Mn) was 4.2, and the glass transition temperature (Tg-A8) was −40° C.

Production Example 9

Synthesis of High Molecular Weight Acrylic Polymer A-9

An ethyl acetate solution of a high molecular weight acrylic polymer A-9 (solid: 20 wt %) was obtained in the same manner as in Production Example 1, except that 63.5 parts by weight of butyl acrylate (BA), 30 parts by weight of methyl acrylate (MA), 3 parts by weight of the macromonomer (AA-6) and 3.5 parts by weight of acrylic acid (AA) were used as monomers and the amount of ethyl acetate as a reaction solvent was changed to 160 parts by weight.

The weight average molecular weight (Mw) of the high molecular weight acrylic polymer (A-9) measured by the same method as in Production Example 1 was 680,000, the molecular weight distribution (Mw/Mn) was 4.9, and the glass transition temperature (Tg-A9) was −31° C.

Production Example 10

Synthesis of High Molecular Weight Acrylic Polymer A-10

A reactor equipped with a stirring blade, a reflux condenser, a thermometer and a nitrogen inlet tube was charged with 76.5 parts by weight of butyl acrylate (BA), 20 parts by weight of methyl acrylate (MA), 3.5 parts by weight of acrylic acid (AA) and 180 parts by weight of ethyl acetate as a solvent. Further, 0.15 part by weight of azobisisobutyronitrile as a reaction initiator was added, and polymerization was carried out under a stream of nitrogen gas at 70° C. for 3.5 hours.

After the reaction, the reaction solution was diluted with a large amount of ethyl acetate. An ethyl acetate solution of a high molecular weight acrylic polymer A-10 (solid: 20 wt %) was thus obtained.

The weight average molecular weight (Mw) of the high molecular weight acrylic polymer (A-10) measured by the same method as in Production Example 1 was 320,000, the molecular weight distribution (Mw/Mn) was 4.5, and the glass transition temperature (Tg-A10) was −40° C.

Production Example 11

Synthesis of Low Molecular Weight Acrylic Polymer B-1

To a reactor equipped with a stirring blade, a reflux condenser, a thermometer and a nitrogen inlet tube, 75 parts by weight of toluene was placed and heated to a temperature of 90° C. under a nitrogen stream.

To the toluene solvent, a mixture consisting of 95 parts by weight of methyl methacrylate (MMA), 5 parts by weight of dimethylaminoethyl methacrylate (DM) and 1 part by weight of reaction initiator azobisisobutyronitrile was added dropwise with a dropping funnel under stirring over a period of 2 hours. Further, additional 1 part by weight of azobisisobutyronitrile was added, and reaction was carried out under reflux for 5 hours.

After the reaction, the reaction solution was diluted with a large amount of toluene. A toluene solution of a low molecular weight acrylic polymer B-1 was thus obtained.

The weight average molecular weight (Mw) of the low molecular weight acrylic polymer (B-1) measured by the same method as in Production Example 1 was 20,000, the molecular weight distribution (Mw/Mn) was 2.5, and the glass transition temperature (Tg-B1) was 99° C.

Production Example 12

Synthesis of Low Molecular Weight Acrylic Polymer B-2

A toluene solution of a low molecular weight acrylic polymer B-2 (solid: 20 wt %) was obtained in the same manner as in Production Example 11, except that the monomers were changed to 100 parts by weight of isobutyl methacrylate (iBMA).

The weight average molecular weight (Mw) of the low molecular weight acrylic polymer (B-2) measured by the same method as in Production Example 1 was 20,000, the molecular weight distribution (Mw/Mn) was 2.8, and the glass transition temperature (Tg-B2) was 48° C.

Production Example 13

Synthesis of Low Molecular Weight Acrylic Polymer B-3

A toluene solution of a low molecular weight acrylic polymer B-3 (solid: 20 wt %) was obtained in the same manner as in Production Example 11, except that 50 parts by weight of n-butyl methacrylate (nBMA) and 50 parts by weight of isobutyl methacrylate (iBMA) were used as monomers.

The weight average molecular weight (Mw) of the low molecular weight acrylic polymer (B-3) measured by the same method as in Production Example 1 was 20,000, the molecular weight distribution (Mw/Mn) was 3.0, and the glass transition temperature (Tg-B3) was 33° C.

Production Example 14

Synthesis of Low Molecular Weight Acrylic Polymer B-4

To a reactor equipped with a stirring blade, a reflux condenser, a thermometer and a nitrogen inlet tube, 75 parts by weight of toluene and 25 parts by weight of isopropyl alcohol were placed and heated to a temperature of 90° C. under a nitrogen stream.

To the solvent mixture, a mixture consisting of 95 parts by weight of methyl methacrylate (MMA), 5 parts by weight of dimethylaminoethyl methacrylate (DM) and 1 part by weight of reaction initiator azobisisobutyronitrile was added dropwise with a dropping funnel under stirring over a period of 2 hours. Additional 1 part by weight of azobisisobutyronitrile was added, and additional 1 part by weight of azobisisobutyronitrile was further added. Reaction was carried out under reflux for 6 hours.

After the reaction, the reaction solution was diluted with a large amount of toluene. A toluene/isopropyl alcohol solution of a low molecular weight acrylic polymer B-4 was thus obtained.

The weight average molecular weight (Mw) of the low molecular weight acrylic polymer (B-4) measured by the same method as in Production Example 1 was 20,000, the molecular weight distribution (Mw/Mn) was 6.0, and the glass transition temperature (Tg-B4) was 99° C.

Production Example 15

Synthesis of Low Molecular Weight Acrylic Polymer B-5

A toluene solution of a low molecular weight acrylic polymer B-5 (solid: 20 wt %) was obtained in the same manner as in Production Example 11, except that 97 parts by weight of methyl methacrylate (MMA) and 3 parts by weight of dimethylaminoethyl methacrylate (DM) were used as monomers.

The weight average molecular weight (Mw) of the low molecular weight acrylic polymer (B-5) measured by the same method as in Production Example 1 was 20,000, the molecular weight distribution (Mw/Mn) was 3.0, and the glass transition temperature (Tg-B5) was 101° C.

Production Example 16

Synthesis of Low Molecular Weight Acrylic Polymer B-6

To a reactor equipped with a stirring blade, a reflux condenser, a thermometer and a nitrogen inlet tube, 75 parts by weight of toluene was placed and heated to a temperature of 80° C. under a nitrogen stream.

To the toluene solvent, a mixture consisting of 95 parts by weight of methyl methacrylate (MMA), 5 parts by weight of dimethylaminoethyl methacrylate (DM) and 0.5 part by weight of reaction initiator azobisisobutyronitrile was added dropwise with a dropping funnel under stirring over a period of 2 hours. Further, additional 1 part by weight of azobisisobutyronitrile was added, and reaction was carried out under reflux for 5 hours.

After the reaction, the reaction solution was diluted with a large amount of toluene. A toluene solution of a low molecular weight acrylic polymer B-6 was thus obtained.

The weight average molecular weight (Mw) of the low molecular weight acrylic polymer (B-6) measured by the same method as in Production Example 1 was 60,000, the molecular weight distribution (Mw/Mn) was 4.0, and the glass transition temperature (Tg-B6) was 99° C.

Production Example 17

Synthesis of Low Molecular Weight Acrylic Polymer B-7

To a reactor equipped with a stirring blade, a reflux condenser, a thermometer and a nitrogen inlet tube, 100 parts by weight of toluene was placed and heated to a temperature of 100° C. under a nitrogen stream.

To the toluene solvent, a mixture consisting of 95 parts by weight of methyl methacrylate (MMA), 5 parts by weight of dimethylaminoethyl methacrylate (DM) and 3 parts by weight of reaction initiator azobisisobutyronitrile was added dropwise with a dropping funnel under stirring over a period of 2 hours. Further, additional 1 part by weight of azobisisobutyronitrile was added, and reaction was carried out under reflux for 5 hours.

After the reaction, the reaction solution was diluted with a large amount of toluene. A toluene solution of a low molecular weight acrylic polymer B-7 was thus obtained.

The weight average molecular weight (Mw) of the low molecular weight acrylic polymer (B-7) measured by the same method as in Production Example 1 was 5,000, the molecular weight distribution (Mw/Mn) was 2.5, and the glass transition temperature (Tg-B7) was 99° C.

The chemical compositions and properties of the acrylic polymers obtained above are shown in Table 1.

TABLE 1

|  | A-1 | A-2 | A-3 | A-4 | A-5 | A-6 | A-7 | A-8 | A-9 |
|---|---|---|---|---|---|---|---|---|---|
| BA | 76.5 | 56.5 | 61.5 | 78.0 | 86.5 | 76.5 | 76.5 | 76.5 | 63.5 |
| MA | 20.0 | 40.0 | 30.0 | 20.0 | 10.0 | 20.0 | 20.0 | 20.0 | 30.0 |
| AA | 3.5 | 3.5 | 3.5 | — | 3.5 | 3.5 | 3.5 | 3.5 | 3.5 |
| AA-6 | — | — | 5.0 | — | — | — | — | — | 3.0 |
| 2-HEA | — | — | — | 2.0 | — | — | — | — | — |
| MMA | — | — | — | — | — | — | — | — | — |
| DM | — | — | — | — | — | — | — | — | — |
| iBMA | — | — | — | — | — | — | — | — | — |
| nBMA | — | — | — | — | — | — | — | — | — |
| Mw | $7.0 \times 10^5$ | $7.0 \times 10^5$ | $7.3 \times 10^5$ | $7.0 \times 10^5$ | $7.0 \times 10^5$ | $7.0 \times 10^5$ | $9.0 \times 10^3$ | $4.5 \times 10^5$ | $6.8 \times 10^5$ |
| Mw/Mn | 4.5 | 4.3 | 4.9 | 4.4 | 4.7 | 12.8 | 4.0 | 4.2 | 4.9 |
| Tg | −40° C. | −28° C. | −29° C. | −40° C. | −45° C. | −40° C. | −40° C. | −40° C. | −31° C. |

TABLE 1-continued

|  | A-10 | B-1 | B-2 | B-3 | B-4 | B-5 | B-6 | B-7 |
|---|---|---|---|---|---|---|---|---|
| BA | 76.5 | — | — | — | — | — | — | — |
| MA | 20.0 | — | — | — | — | — | — | — |
| AA | 3.5 | — | — | — | — | — | — | — |
| AA-6 | — | — | — | — | — | — | — | — |
| 2-HEA | — | — | — | — | — | — | — | — |
| MMA | — | 95.0 | — | — | 95.0 | 97.0 | 95.0 | 95.0 |
| DM | — | 5.0 | — | — | 5.0 | 3.0 | 5.0 | 5.0 |
| iBMA | — | — | 100.0 | 50.0 | — | — | — | — |
| nBMA | — | — | — | 50.0 | — | — | — | — |
| Mw | $3.2 \times 10^5$ | $2.0 \times 10^4$ | $2.0 \times 10^4$ | $2.0 \times 10^4$ | $2.0 \times 10^4$ | $2.0 \times 10^4$ | $6.0 \times 10^4$ | $5.0 \times 10^3$ |
| Mw/Mn | 4.5 | 2.5 | 2.8 | 3.0 | 6.0 | 3.0 | 4.0 | 2.5 |
| Tg | −40° C. | 99° C. | 48° C. | 33° C. | 99° C. | 101° C. | 99° C. | 99° C. |

In Table 1, AA-6 is the macromonomer AA-6 (methacryloyl group-terminated poly(methyl methacrylate) manufactured by TOAGOSEI CO., LTD.).

Example 1

100 Parts by weight of the high molecular weight acrylic polymer A-1 from Production Example 1, 10 parts by weight of the low molecular weight acrylic polymer B-1 from Production Example 11, and 0.05 part by weight of an epoxy crosslinking agent (TETRAD-X manufactured by MITSUBISHI GAS CHEMICAL COMPANY, INC.) were blended. The resultant composition was spread on a silicone-coated 38 μm thick PET film such that the dry thickness of the composition would be 25 μm. The composition was then dried and was applied onto a 188 μm thick PET film. The composition was aged at 23° C. for 7 days. A pressure-sensitive adhesive film was thus manufactured.

The pressure-sensitive adhesive film was tested for durability, thermal cycle resistance, re-workability, adhesion and gel fraction as described below. The results are set forth in Table 2.

Testing Conditions

Durability: A 150×250 mm specimen was applied to a glass plate or an EMI filter (a copper mesh film) and was treated in an autoclave (55° C., 5 atm, 30 minutes). The specimen was allowed to stand at 90° C. for 500 hours. Changes in appearance were visually inspected for.

AA: No lifting
BB: Lifting (less than 1 cm)
CC: Large number of lifting (1 cm or more)

Thermal cycle test: A 150×250 mm specimen was applied to a glass plate or an EMI filter (a copper mesh film) and was treated in an autoclave (55° C., 5 atm, 30 minutes). The specimen was subjected to 100 cycles of thermal impact with a thermal impact tester wherein each cycle consisted of −40° C.×30 minutes and 80° C.×30 minutes. Changes in appearance were visually inspected for.

AA: No lifting
BB: Lifting (less than 1 cm)
CC: Large number of lifting (1 cm or more)

Re-workability test: A 100×100 mm specimen was applied to a glass plate and was treated in an autoclave (55° C., 5 atm, 30 minutes). The specimen was allowed to stand for 1 hour, and was removed by hand. Residual adhesive on the glass plate was examined.

Adhesion: A 25×150 mm specimen was applied to a glass plate and was treated in an autoclave (55° C., 5 atm, 30 minutes). The specimen was allowed to stand for 1 hour, and was removed by means of a tensile tester at a peeling rate of 50 mm/min, a peeling angle of 180°, a test temperature of 23° C. and a test humidity of 65%, thereby measuring the peel strength.

Gel fraction: The pressure-sensitive adhesive was unpeeled from the specimen and was weighed (initial weight (1)). The pressure-sensitive adhesive was soaked in approximately 50 g of ethyl acetate for 24 hours and was filtered through a 200 mesh metallic gauze that had been previously weighed (metallic gauze weight (2)). The residue on the metallic gauze was dried at 80° C. for 3 hours and was weighed together with the gauze (metallic gauze+gel weight (3)). The gel fraction was calculated from the following equation based on the data obtained above.

Gel fraction (%)=[(metallic gauze+gel weight (3))−(metallic gauze weight (2))]/(initial weight (1))×100

The results are set forth in Table 2.

Example 2

A pressure-sensitive adhesive film was manufactured in the same manner as in Example 1, except that 100 parts by weight of the high molecular weight acrylic polymer (A-1) was replaced by 100 parts by weight of the high molecular weight acrylic polymer (A-2) from Production Example 2.

The pressure-sensitive adhesive film was tested for durability, thermal cycle resistance, re-workability, adhesion and gel fraction as described in Example 1. The results are set forth in Table 2.

Example 3

A pressure-sensitive adhesive film was manufactured in the same manner as in Example 1, except that 10 parts by weight of the low molecular weight acrylic polymer (B-1) was replaced by 10 parts by weight of the low molecular weight acrylic polymer (B-2) from Production Example 12.

The pressure-sensitive adhesive film was tested for durability, thermal cycle resistance, re-workability, adhesion and gel fraction as described in Example 1. The results are set forth in Table 2.

Example 4

A pressure-sensitive adhesive film was manufactured in the same manner as in Example 1, except that 100 parts by weight of the high molecular weight acrylic polymer (A-1) was replaced by 100 parts by weight of the high molecular weight acrylic polymer (A-3) from Production Example 3.

The pressure-sensitive adhesive film was tested for durability, thermal cycle resistance, re-workability, adhesion and gel fraction as described in Example 1. The results are set forth in Table 2.

Example 5

A pressure-sensitive adhesive film was manufactured in the same manner as in Example 1, except that 100 parts by weight of the high molecular weight acrylic polymer (A-1) was replaced by 100 parts by weight of the high molecular weight acrylic polymer (A-4) from Production Example 4, 10 parts by weight of the low molecular weight acrylic polymer (B-1) was replaced by 10 parts by weight of the low molecular weight acrylic polymer (B-2) from Production Example 12, and 0.05 part by weight of curing agent TETRAD-X was replaced by 1.0 part by weight of CORONATE L (manufactured by NIPPON POLYURETHANE INDUSTRY CO., LTD.)

The pressure-sensitive adhesive film was tested for durability, thermal cycle resistance, re-workability, adhesion and gel fraction as described in Example 1. The results are set forth in Table 2.

Example 6

A pressure-sensitive adhesive film was manufactured in the same manner as in Example 1, except that 100 parts by weight of the high molecular weight acrylic polymer (A-1) was replaced by 100 parts by weight of the high molecular weight acrylic polymer (A-8) from Production Example 8.

The pressure-sensitive adhesive film was tested for durability, thermal cycle resistance, re-workability, adhesion and gel fraction as described in Example 1. The results are set forth in Table 2.

Example 7

A pressure-sensitive adhesive film was manufactured in the same manner as in Example 1, except that 100 parts by weight of the high molecular weight acrylic polymer (A-1) was replaced by 100 parts by weight of the high molecular weight acrylic polymer (A-9) from Production Example 9.

The pressure-sensitive adhesive film was tested for durability, thermal cycle resistance, re-workability, adhesion and gel fraction as described in Example 1. The results are set forth in Table 2.

Example 8

A pressure-sensitive adhesive film was manufactured in the same manner as in Example 1, except that 10 parts by weight of the low molecular weight acrylic polymer (B-1) was replaced by 10 parts by weight of the low molecular weight acrylic polymer (B-5) from Production Example 15.

The pressure-sensitive adhesive film was tested for durability, thermal cycle resistance, re-workability, adhesion and gel fraction as described in Example 1. The results are set forth in Table 2.

Comparative Example 1

A pressure-sensitive adhesive film was manufactured in the same manner as in Example 1, except that the low molecular weight acrylic polymer (B-1) was not used.

The pressure-sensitive adhesive film was tested for durability, thermal cycle resistance, re-workability, adhesion and gel fraction as described in Example 1. The results are set forth in Table 2.

Comparative Example 2

A pressure-sensitive adhesive film was manufactured in the same manner as in Example 1, except that 100 parts by weight of the high molecular weight acrylic polymer (A-1) was replaced by 100 parts by weight of the high molecular weight acrylic polymer (A-5) from Production Example 5.

The pressure-sensitive adhesive film was tested for durability, thermal cycle resistance, re-workability, adhesion and gel fraction as described in Example 1. The results are set forth in Table 2.

Comparative Example 3

A pressure-sensitive adhesive film was manufactured in the same manner as in Example 1, except that 100 parts by weight of the high molecular weight acrylic polymer (A-1) was replaced by 100 parts by weight of the high molecular weight acrylic polymer (A-6) from Production Example 6.

The pressure-sensitive adhesive film was tested for durability, thermal cycle resistance, re-workability, adhesion and gel fraction as described in Example 1. The results are set forth in Table 2.

Comparative Example 4

A pressure-sensitive adhesive film was manufactured in the same manner as in Example 1, except that 100 parts by weight of the high molecular weight acrylic polymer (A-1) was replaced by 100 parts by weight of the high molecular weight acrylic polymer (A-7) from Production Example 7.

The pressure-sensitive adhesive film was tested for durability, thermal cycle resistance, re-workability, adhesion and gel fraction as described in Example 1. The results are set forth in Table 2.

Comparative Example 5

A pressure-sensitive adhesive film was manufactured in the same manner as in Example 1, except that 10 parts by weight of the low molecular weight acrylic polymer (B-1) was replaced by 10 parts by weight of the low molecular weight acrylic polymer (B-3) from Production Example 13.

The pressure-sensitive adhesive film was tested for durability, thermal cycle resistance, re-workability, adhesion and gel fraction as described in Example 1. The results are set forth in Table 2.

Comparative Example 6

A pressure-sensitive adhesive film was manufactured in the same manner as in Example 1, except that the amount of curing agent TETRAD-X was changed from 0.05 part by weight to 0.2 part by weight.

The pressure-sensitive adhesive film was tested for durability, thermal cycle resistance, re-workability, adhesion and gel fraction as described in Example 1. The results are set forth in Table 2.

Comparative Example 7

A pressure-sensitive adhesive film was manufactured in the same manner as in Example 1, except that the amount of curing agent TETRAD-X was changed from 0.05 part by weight to 0.02 part by weight.

The pressure-sensitive adhesive film was tested for durability, thermal cycle resistance, re-workability, adhesion and gel fraction as described in Example 1. The results are set forth in Table 2.

Comparative Example 8

A pressure-sensitive adhesive film was manufactured in the same manner as in Example 1, except that 10 parts by weight of the low molecular weight acrylic polymer (B-1) was replaced by 10 parts by weight of the low molecular weight acrylic polymer (B-4) from Production Example 14.

The pressure-sensitive adhesive film was tested for durability, thermal cycle resistance, re-workability, adhesion and gel fraction as described in Example 1. The results are set forth in Table 2.

Comparative Example 9

A pressure-sensitive adhesive film was manufactured in the same manner as in Example 1, except that the amount of the low molecular weight acrylic polymer (B-1) from Production Example 11 was changed from 10 parts by weight to 30 parts by weight.

The pressure-sensitive adhesive film was tested for durability, thermal cycle resistance, re-workability, adhesion and gel fraction as described in Example 1. The results are set forth in Table 2.

Comparative Example 10

A pressure-sensitive adhesive film was manufactured in the same manner as in Example 1, except that 100 parts by weight of the high molecular weight acrylic polymer (A-1) was replaced by 100 parts by weight of the high molecular weight acrylic polymer (A-10) from Production Example 10.

The pressure-sensitive adhesive film was tested for durability, thermal cycle resistance, re-workability, adhesion and gel fraction as described in Example 1. The results are set forth in Table 2.

Comparative Example 11

A pressure-sensitive adhesive film was manufactured in the same manner as in Example 1, except that 10 parts by weight of the low molecular weight acrylic polymer (B-1) was replaced by 10 parts by weight of the low molecular weight acrylic polymer (B-6) from Production Example 16.

The pressure-sensitive adhesive film was tested for durability, thermal cycle resistance, re-workability, adhesion and gel fraction as described in Example 1. The results are set forth in Table 2.

Comparative Example 12

A pressure-sensitive adhesive film was manufactured in the same manner as in Example 1, except that 10 parts by weight of the low molecular weight acrylic polymer (B-1) was replaced by 10 parts by weight of the low molecular weight acrylic polymer (B-7) from Production Example 17.

The pressure-sensitive adhesive film was tested for durability, thermal cycle resistance, re-workability, adhesion and gel fraction as described in Example 1. The results are set forth in Table 2.

TABLE 2

| | High molecular weight acrylic polymer | | | | | | | | | | Low molecular weight acrylic polymer | | | | | | |
|---|---|---|---|---|---|---|---|---|---|---|---|---|---|---|---|---|---|
| | A-1 | A-2 | A-3 | A-4 | A-5 | A-6 | A-7 | A-8 | A-9 | A-10 | B-1 | B-2 | B-3 | B-4 | B-5 | B-6 | B-7 |
| Ex. 1 | 100 | — | — | — | — | — | — | — | — | — | 10 | — | — | — | — | — | — |
| Ex. 2 | — | 100 | — | — | — | — | — | — | — | — | 10 | — | — | — | — | — | — |
| Ex. 3 | 100 | — | — | — | — | — | — | — | — | — | — | — | 10 | — | — | — | — |
| Ex. 4 | — | — | 100 | — | — | — | — | — | — | — | 10 | — | — | — | — | — | — |
| Ex. 5 | — | — | — | 100 | — | — | — | — | — | — | — | 10 | — | — | — | — | — |
| Ex. 6 | — | — | — | — | — | — | — | 100 | — | — | 10 | — | — | — | — | — | — |
| Ex. 7 | — | — | — | — | — | — | — | — | 100 | — | 10 | — | — | — | — | — | — |
| Ex. 8 | 100 | — | — | — | — | — | — | — | — | — | — | — | — | — | 10 | — | — |
| Comp. Ex. 1 | 100 | — | — | — | — | — | — | — | — | — | — | — | — | — | — | — | — |
| Comp. Ex. 2 | — | — | — | 100 | — | — | — | — | — | — | 10 | — | — | — | — | — | — |
| Comp. Ex. 3 | — | — | — | — | 100 | — | — | — | — | — | 10 | — | — | — | — | — | — |
| Comp. Ex. 4 | — | — | — | — | — | 100 | — | — | — | — | 10 | — | — | — | — | — | — |
| Comp. Ex. 5 | 100 | — | — | — | — | — | — | — | — | — | — | — | 10 | — | — | — | — |
| Comp. Ex. 6 | 100 | — | — | — | — | — | — | — | — | — | 10 | — | — | — | — | — | — |
| Comp. Ex. 7 | 100 | — | — | — | — | — | — | — | — | — | 10 | — | — | — | — | — | — |
| Comp. Ex. 8 | 100 | — | — | — | — | — | — | — | — | — | — | — | — | 10 | — | — | — |
| Comp. Ex. 9 | 100 | — | — | — | — | — | — | — | — | — | 30 | — | — | — | — | — | — |
| Comp. Ex. 10 | — | — | — | — | — | — | — | — | — | 100 | 10 | — | — | — | — | — | — |
| Comp. Ex. 11 | 100 | — | — | — | — | — | — | — | — | — | — | — | — | — | — | 10 | — |
| Comp. Ex. 12 | 100 | — | — | — | — | — | — | — | — | — | — | — | — | — | — | — | 10 |

| | TETRAD X | CORONATE L | Durability 90° C. | | Thermal cycle | | Re-workability | Adhesion N/25 mm | Gel fraction % |
|---|---|---|---|---|---|---|---|---|---|
| | | | Glass | EMI | Glass | EMI | | | |
| Ex. 1 | 0.05 | — | AA | AA | AA | AA | AA | 10 | 70 |
| Ex. 2 | 0.05 | — | AA | AA | AA | AA | AA | 14 | 74 |
| Ex. 3 | 0.05 | — | AA | AA | AA | AA | AA | 12 | 68 |
| Ex. 4 | 0.05 | — | AA | AA | AA | AA | AA | 14 | 70 |
| Ex. 5 | — | 1.0 | AA | AA | AA | AA | AA | 11 | 65 |
| Ex. 6 | 0.05 | — | AA | AA | AA | AA | AA | 12 | 68 |
| Ex. 7 | 0.05 | — | AA | AA | AA | AA | AA | 13 | 70 |

TABLE 2-continued

| | | | | | | | | | |
|---|---|---|---|---|---|---|---|---|---|
| Ex. 8 | 0.05 | — | AA | AA | AA | AA | AA | 10 | 68 |
| Comp. Ex. 1 | 0.05 | — | CC | CC | CC | CC | AA | 7 | 78 |
| Comp. Ex. 2 | 0.05 | — | AA | BB | BB | BB | AA | 9 | 70 |
| Comp. Ex. 3 | 0.05 | — | CC | BB | CC | BB | AA | 9 | 66 |
| Comp. Ex. 4 | 0.05 | — | AA | BB | AA | BB | AA | 10 | 79 |
| Comp. Ex. 5 | 0.05 | — | CC | CC | CC | CC | BB | 7 | 72 |
| Comp. Ex. 6 | 0.2 | — | AA | CC | AA | CC | AA | 7 | 92 |
| Comp. Ex. 7 | 0.02 | — | CC | CC | CC | CC | CC | 16 | 46 |
| Comp. Ex. 8 | 0.05 | — | CC | CC | CC | CC | AA | 10 | 70 |
| Comp. Ex. 9 | 0.05 | — | AA | BB | AA | BB | CC | 20 | 60 |
| Comp. Ex. 10 | 0.05 | — | BB | BB | CC | CC | AA | 14 | 70 |
| Comp. Ex. 11 | 0.05 | — | AA | BB | AA | BB | AA | 13 | 72 |
| Comp. Ex. 12 | 0.05 | — | AA | BB | BB | BB | BB | 16 | 67 |

The pressure-sensitive adhesive compositions for PDP front filters according to the invention contain the specific high molecular weight acrylic polymer (A) and the specific low molecular weight acrylic polymer (B) in a weight ratio A:B=100:5-20 and are crosslinked with the crosslinking agent to a gel fraction of 50 to 90% and have a 90° peel strength of 5 to 15 N/25 mm. The pressure-sensitive adhesive compositions can bond EMI filters or the like to the PDP front stably for long periods. In particular, both the high molecular weight acrylic polymer (A) and the low molecular weight acrylic polymer (B) have a molecular weight distribution (Mw/Mn) of not more than 5. By the acrylic polymers having this narrow molecular weight distribution (Mw/Mn), the pressure-sensitive adhesive compositions show excellent adhesion with respect to both glass and an EMI filter composed of a copper mesh. The pressure-sensitive adhesive compositions can bond a copper mesh EMI filter to glass and permit the EMI filter to be removed therefrom without residual adhesive.

The invention claimed is:

1. A pressure-sensitive adhesive composition for bonding an EMI film to a PDP device,
   wherein the composition comprises a high molecular weight acrylic polymer A having requirements a-1 to a-6 below and a low molecular weight acrylic polymer B having requirements b-1 to b-5 below in a weight ratio A:B=100:5-20, and is crosslinked with a crosslinking agent to a gel fraction of 50 to 70% and has a 90° peel strength (peeling rate=50 mm/min) of 10 to 15 N/25 mm:
   <high molecular weight acrylic polymer A>
   the polymer is a copolymer which comprises:
   a-1: an alkyl (meth)acrylate monomer having $C_{1-12}$ alkyl group and, based on 100 parts by weight of the (meth) acrylate monomer (a-1),
   a-2: 1 to 5 parts by weight of a COOH or OH group-containing monomer, and
   a-3: 0 to 5 parts by weight of a monomer copolymerizable with the (meth)acrylate monomer (a-1); and which has:
   a-4: a weight average molecular weight (Mw) of 500,000 to 700,000,
   a-5: a molecular weight distribution (Mw/Mn) of not more than 5, and
   a-6: a glass transition temperature (Tg-A) of the acrylic polymer A in the range of −40 to −20° C.;
   <low molecular weight acrylic polymer B>
   the polymer is a copolymer which comprises:
   b-1: a (meth)acrylate monomer and, based on 100 parts by weight of the (meth)acrylate monomer (b-1),
   b-2: greater than 0 to less than 10 parts by weight of a monomer copolymerizable with the (meth)acrylate monomer (b-1), and which has:
   b-3: a weight average molecular weight (Mw) of 20,000 to 40,000,
   b-4: a molecular weight distribution (Mw/Mn) of not more than 5, and
   b-5: a glass transition temperature (Tg-B) of the acrylic polymer B in the range of 40 to 105° C.

2. The pressure-sensitive adhesive composition according to claim 1, wherein the crosslinking agent is an epoxy crosslinking agent and/or an isocyanate crosslinking agent.

3. The pressure-sensitive adhesive composition according to claim 1, wherein the alkyl (meth)acrylate monomer having $C_{1-12}$ alkyl groups comprises methyl (meth)acrylate.

4. A pressure-sensitive adhesive composition for bonding an EMI film to a PDP device,
   wherein the composition comprises a high molecular weight acrylic polymer A having requirements a-1 to a-6 below and a low molecular weight acrylic polymer B having requirements b-1 to b-5 below in a weight ratio A:B=100:5-20, and is crosslinked with a crosslinking agent to a gel fraction of 50 to 70% and has a 90° peel strength (peeling rate=50 mm/min) of 10 to 15 N/25 mm:
   <high molecular weight acrylic polymer A>
   the polymer is a copolymer which comprises:
   a-1: an alkyl (meth)acrylate monomer having $C_{1-12}$ alkyl group and, based on 100 parts by weight of the (meth) acrylate monomer (a-1),
   a-2: 1 to 5 parts by weight of a COOH or OH group-containing monomer, and
   a-3: 1 to 5 parts by weight of a monomer comprising a macromonomer in an amount from 1 to 5 parts by weight, copolymerizable with the (meth)acrylate monomer (a-1); and which has:
   a-4: a weight average molecular weight (Mw) of 500,000 to 700,000,
   a-5: a molecular weight distribution (Mw/Mn) of not more than 5, and
   a-6: a glass transition temperature (Tg-A) of the acrylic polymer A in the range of −40 to −20° C.;
   >low molecular weight acrylic polymer B>
   the polymer is a copolymer which comprises:
   b-1: a (meth)acrylate monomer and, based on 100 parts by weight of the (meth)acrylate monomer (b-1),
   b-2: greater than 0 to less than 10 parts by weight of a monomer copolymerizable with the (meth)acrylate monomer (b-1); and which has:
   b-3: a weight average molecular weight (Mw) of 20,000 to 40,000,
   b-4: a molecular weight distribution (Mw/Mn) of not more than 5, and
   b-5: a glass transition temperature (Tg-B) of the acrylic polymer B in the range of 40 to 105° C.

5. The pressure-sensitive adhesive composition according to claim 4, wherein the weight average molecular weight (Mw) of the high molecular weight parts of the macromonomer is in the range of 1,000 to 50,000.

* * * * *

UNITED STATES PATENT AND TRADEMARK OFFICE
CERTIFICATE OF CORRECTION

PATENT NO. : 8,445,597 B2
APPLICATION NO. : 12/374377
DATED : May 21, 2013
INVENTOR(S) : Koji Tomita It is certified that error appears in the above-identified patent and that said Letters Patent is hereby corrected as shown below:

In the Claims:

Column 21, Line 67, Claim 1, delete "(b-1)," and insert -- (b-1); --

Column 22, Line 55, Claim 4, delete ">low" and insert -- <low --

Signed and Sealed this
Third Day of September, 2013

Teresa Stanek Rea
*Acting Director of the United States Patent and Trademark Office*